United States Patent Office 3,803,246
Patented Apr. 9, 1974

3,803,246
OXYALKYLATION OF DIPHENOLS
Kenneth S. Rosenzweig, Timber Creek, Newark, Del., and George E. Woods, Chattanooga, Tenn., assignors to ICI America Inc., Wilmington, Del.
No Drawing. Filed Mar. 3, 1971, Ser. No. 120,734
Int. Cl. C07c 41/02
U.S. Cl. 260—613 B    2 Claims

ABSTRACT OF THE DISCLOSURE

Oxyalkylated diphenol compositions containing very low amounts of diphenol decomposition products and oxyalkylated diphenol compositions comprising substantially pure polyoxyalkylene(2) diphenol are obtained by reacting diphenol with alkylene oxide in the presence of lithium hydroxide or lithium acetate. Polyesters having improved corrosion resistance, shelf-life, uniformity, stability and color are prepared with the oxyalkylated diphenol products.

---

This invention relates to an improved process for the oxyalkylation of diphenols and to novel oxyalkylated diphenol compositions. This invention further relates to improved polyesters prepared with oxyalkylated diphenol compositions.

U.S. Pat. No. 2,331,265 discloses that oxyalkylated diphenol compositions may be prepared by reacting alkylene oxides with diphenols in the presence of an alkaline catalyst. Sodium hydroxide is the alkaline catalyst most widely used in the commercial production of oxyalkylated diphenols. It is known that when an alkylene oxide is reacted with a diphenol in the presence of sodium hydroxide, the resulting oxyalkylated diphenol product is a congeneric mixture of polyoxyalkylene ethers of the diphenol which differ from each other in the number of oxyalkylene groups per diphenol moiety. The average number of oxyalkylene groups per diphenol moiety is equal to the molar ratio of the mols of alkylene oxide to the mols of diphenol reacted. For example, the reaction of 2 mols of alkylene oxide with one mol of diphenol in the presence of sodium hydroxide results in the formation of an alkoxylated diphenol product having an average of two oxyalkylene groups per diphenol group and comprising a congeneric mixture of alkoxylated diphenols containing one, two, and three oxyalkylene groups.

It has now been discovered that when an alkylene oxide is reacted with a dihenol under the influence of sodium hydroxide, the resulting oxyalkylated diphenol composition contains, in addition to the congeneric mixture of alkoxylated diphenols, substantial amounts of oxyalkylated decomposition products of diphenol, such as oxyalkylated phenol and oxyalkylated isopropenyl phenol and/or tris-phenol. It has also been found that these decomposition products result from the action of the sodium hydroxide catalyst on the diphenol. Although the presence of these decomposition products may not be particularly troublesome in certain applications, they do give rise to serious problems in other important fields of application of oxyalkylated diphenols. For example, when oxyalkylated diphenols containing substantial amounts of decomposition products are used as an intermediate in the preparation of polyester resins, the decomposition products have a serious effect on the properties of the resulting polyester causing premature gelation, reduced corrosion resistance, poor shelf-life stability, poor uniformity, and discoloration.

It is an object of this invention to provide an improved process for the production of oxyalkylated diphenol compositions.

It is an object of this invention to provide a process for the production of oxyalkylated diphenol compositions which are not congeneric mixtures of oxyalkylated diphenols.

It is an object of this invention to provide a process for the production of substantially pure polyoxyalkylene (2) diphenol.

It is an object of this invention to provide a process for the production of oxyalkylated diphenol compositions containing substantially reduced amounts of diphenol decomposition products.

It is an object of this invention to provide novel oxyalkylated diphenol product.

It is an object of this invention to provide novel polyester compositions.

The foregoing objects and still further objects are broadly achieved according to the present invention by providing an improved process for the production of an oxyalkylated diphenol composition which comprises reacting a diphenol characterized by the formula

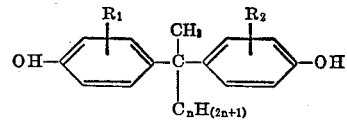

wherein $n$ is 1 or 2 and wherein $R_1$ and $R_2$ are independently selected from the group consisting of hydrogen and alkyl groups containing from 1 to 4 carbon atoms, such as methyl, ethyl, propyl, and butyl, with an alkylene oxide in the presence of lithium hydroxide or lithium acetate.

The oxyalkylated diphenol composition of this invention, which is prepared by reacting alkylene oxide with diphenol in the presence of the lithium catalyst, is substantially free of decomposition products of diphenols and is substantially pure oxyalkylated diphenol containing two oxyalkylene groups per diphenol moiety. Oxyalkylated diphenols containing more than two oxyalkylene groups per diphenol moiety may be prepared by reacting the polyoxyalkylene(2) diphenol composition prepared with the lithium catalyst with additional alkylene oxide in the presence of a conventional alkoxylation catalyst, such as sodium hydroxide, sodium acetate, potassium hydroxide, potassium acetate, cesium hydroxide, and cesium acetate. Accordingly, this invention also provides a process for the production of oxyalkylated diphenols which comprises (1) first reacting alkylene oxide with diphenol in the presence of the lithium alkoxylation catalyst and (2) reacting the resulting oxyalkylated diphenol with additional alkylene oxide in the presence of a non-lithium containing alkoxylation catalyst.

Illustrative examples of diphenols which may be used in the process of this invention include 2,2-bis(4-hydroxy-phenyl) propane;
2,2,bis(4-hydroxy-3-methyl-phenyl) propane;
2,2,bis(4-hydroxyphenyl) butane;
2,2,bis(4-hydroxy-3-ethyl-phenyl) propane;
2,2,bis(4-hydroxy-3-propyl-phenyl) propane;
2,2,bis(4-hydroxy-3-butyl-phenyl) propane;
2,2,bis(4-hydroxy-2-methyl-phenyl) propane;
2,2,bis(4-hydroxy-2-propyl-phenyl) propane;
2-(4-hydroxy-phenyl)-2 - (4-hydroxy-3-methyl - phenyl) propane;
2-(4-hydroxyphenyl)-2-(4-hydroxy-3-propyl-phenyl) propane;
2-(4-hydroxy-3-methyl-phenyl)-2-(4-hydroxy-3-butyl-phenyl) propane;

and the like. Mixtures of diphenols having the above described formula may also be used. The preferred diphenol is 2,2,bis(4-hydroxyphenyl) propane.

The alkylene oxide reacted with the above defined diphenols is preferably a 1,2-alkylene oxide such as ethylene oxide, 1,2-propylene oxide, and 1,2-butylene oxide although other alkylene oxides such as butadiene monoxide and amylene oxide may be used. Cyclic alkylene oxides, such as cyclohexene oxide, and aromatic alkylene oxides, such as styrene oxide, may also be used. Mixtures of alkylene oxides may also be employed. The term "alkylene oxide" as used herein is intended to include the cycloalkylene oxide and aryl-substituted alkylene oxides.

Reaction conditions, such as catalyst concentration, amount of diphenol and alkylene oxide, reaction temperature, reaction time, use of non-reactive solvent, etc., may vary widely and form no part of the present invention. The reaction conditions disclosed in the prior art for the oxyalkylation of diphenols in the presence of sodium hydroxide catalyst, for example, U.S. Pat. Nos. 3,030,426; 2,782,240; and 2,331,265 may also be used with the lithium hydroxide and lithium acetate catalyst herein. Generally the oxyalkylation is carried out by contacting alkylene oxide with diphenol at a temperature from 100° C. to 200° C., and preferably 160-190° C. for from ½ to 5 hours and in the presence of from .001 to 2% by weight of the lithium catalyst based on weight of diphenol charged. The amount of alkylene oxide used in the process of this invention is not critical since the resulting oxyalkylated diphenol product is substantially pure polyoxyalkylene(2) diphenol, regardless of the amount of alkylene oxide employed. Although applicants do not intend to be bound hereby, it is presently believed that the lithium catalyst does not act as catalyst for the oxyalkylation of aliphatic hydroxyls but acts only as a catalyst for the oxyalkylation of phenolic hydroxyls.

It has also been discovered in accordance with the present invention that polyesters having improved corrosion resistance, stability, shelf-life, uniformity, and color may be prepared by esterifying the oxyalkylated diphenol compositions described above with an approximately equimolar amount of dicarboxylic acids or anhydrides, at least the major portion of which comprises an ethylenically unsaturated dicarboxylic acid or anhydride. Examples of ethylenically unsaturated dicarboxylic acids and anhydrides which may be used to carry out the esterification are maleic acid, fumaric acid, and maleic anhydride. Mixtures or ethylenically unsaturated dicarboxylic acids may also be used. Minor proportions of the esterifying dicarboxylic acid or anhydride may comprise saturated carboxylic acids or anhydrides, aromatic carboxylic acids or anhydrides, or other unsaturated aliphatic carboxylic acids or anhydrides, such as adipic acid, succinic acid, phthalic acid, phthalic anhydride, and itaconic acid. It is preferred, however, that at least 80 mol percent of the dicarboxylic acid or anhydride be ethylenically unsaturated dicarboxylic acid or anhydride.

The improved polyesters of this invention may be prepared by esterification techniques well known in the art. The oxyalkylated diphenol compositions and dicarboxylic acid or anhydride are usually reacted in amounts such that at the completion of the reaction their radicals are present in substantially stoichiometric proportions. The reaction may be performed in an inert atmosphere, employing moderate temperatures and substantially atmospheric pressure during the early stages to minimize the loss of dicarboxylic acid or anhydride by volatilization, raising the temperature and reducing the pressure in the later stages of the reaction. Esterification catalysts may be used, although it is generally preferred to carry out the reaction in the absence of catalyst to avoid contamination of the final resinous product with catalyst residue. If desired, a small amount of a polymerization inhibitor such as hydroquinone or pyrogallol may be added to the charge during the esterification or after the esterification has been completed. A more detailed description of esterification techniques and reactants which may be used to prepare the polyesters is found in U.S. Pat. No. 2,634,251 and U.S. Pat. No. 3,214,491, the disclosure of which are hereby incorporated hereinto by reference.

The polyesters of this invention are copolymerizable with ethylenically unsaturated monomers to yield resins useful in the coating, casting, and laminating arts. The polyester may be dissolved in the ethylenically unsaturated monomer to yield clear, stable, uniform solutions. Among the numerous ethylenically unsaturated monomers which may be used are vinylidene monomers such as styrene, vinyl toluene, chlorostyrene, divinylbenzene, acrylonitrile, methyl methacrylate, vinyl acetate, ethyl acrylate, methylstyrene, vinyl pyriidne, and 2-ethyl hexyl acrylate.

Conventional reaction initiators of the kind frequently referred to as "free radical catalysts" may be used to initiate the reaction between the novel polyester and the ethylenically unsaturated monomer. Typical of such initiators or "catalysts" are organic peroxy compounds such as methylethyl ketone peroxide, benzoyl peroxide, t-butyl perbenzoate, cumene hydroperoxide, and succinic peroxide.

Accelerators for the reaction between the novel polyester and the ethylenically unsaturated monomer may also be used. Exemplary of such accelerators are dimethyl aniline and cobalt naphthenate.

In order that those skilled in the art may better understand how the present invention may be practiced, the following examples are given. These examples are set forth solely for the purpose of illustration and any specific enumeration of details contained therein should not be interpreted as expressing limitations of this invention. All parts and percentages are by weight, unless otherwise stated.

EXAMPLE 1

3200 grams of 2,2-bis(4-hydroxyphenyl) propane are added to a nitrogen purged preheated stirred autoclave and heated to a temperature of 175° C. The autoclave is then evacuated to a maximum absolute pressure of 100 mm. mercury and purged with nitrogen until a 5 p.s.i.g. pressure is obtained. 10.20 grams of lithium acetate are added to the autoclave and the autoclave evacuated to a maximum pressure of 100 mm. mercury (absolute). 1790 grams of propylene oxide is added to the reaction mixture over a 2.17 hour period while maintaining a temperature at 175° C. The pressure is allowed to rise to 35 p.s.i.g. during the oxide addition. After the addition of the propylene oxide, the reaction is continued for an additional 1.4 hours. The reaction product is then stripped of volatile materials at 120° C. to remove any excess propylene oxide and any entrapped gases. The resulting polyoxypropylene(2) 2,2,bis(4-hydroxyphenyl) propane product is viscous at room temperature and has the following analysis: acid number 0.7, hydroxyl number 320, and sulfated ash 0.108%.

EXAMPLE 2

Following the procedure of Example 1, 3200 grams of 2,2,bis(4-hydroxyphenyl) propane are added to the autoclave and heated to 160° C. 13.05 grams of lithium hydroxide monohydrate are added to the autoclave. 1790 grams of propylene oxide are then added over a period of 10 minutes. The pressure is allowed to rise to 80 p.s.i.g. during the oxide addition. After the addition of the propylene oxide, the reaction is continued for 1.33 hours. The product is stripped of materials volatile at 120° C. and then de-ashed by the addition of 0.6 mol of 85% phosphoric acid per mol of lithium hydroxide charged, and the total product is filtered. The resulting polyoxypropylene(2) 2,2,bis(4-hydroxyphenyl) propane is a clear viscous liquid at room temperature and has the following analysis: acid number 0.84, hydroxyl number 321, and sulfated ash 0.003%.

EXAMPLE 3

3200 grams of 2,2-bis(4-hydroxyphenyl)propane are added to a nitrogen purged preheated autoclave provided with stirring means and heated to a temperature of 185° C. The autoclave is then evacuated to a maximum of 100 mm. mercury (absolute) and purged with nitrogen until a 5 p.s.i.g. pressure is obtained. 4.35 grams of lithium hydroxide monohydrate are added to the autoclave and the autoclave again evacuated to a maximum pressure of 100 mm. mercury (absolute). 1790 grams of propylene oxide are then added to the reaction mixture over a period of 45 minutes while maintaining the temperature at 185° C. The pressure is allowed to rise to 50 p.s.i.g. during the oxide addition. The reaction was continued for 1.08 hours after the addition of the propylene oxide. The temperature is then decreased to 120° C. The reaction product is then stripped of volatile materials at 120° C. to remove any excess oxide and entrapped gases. The product is then de-ashed by the addition of 0.6 mol of 85% phosphoric acid per mol of lithium hydroxide charged and the total product is filtered. The resulting polyoxypropylene(2) 2,2-bis(4-hydroxyphenyl) propane product is a clear viscous liquid at room temperature and has the following analysis: acid number 0.25, hydroxyl number 325, and sulfated ash 0.014%.

EXAMPLE 4

3510 grams of 2,2-bis(4-hydroxyphenyl) propane are added to a nitrogen purged preheated autoclave and heated to 160° C. The autoclave is then evacuated to a maximum absolute pressure of 100 mm. mercury (absolute) and purged with nitrogen until a 5 p.s.i.g. pressure is obtained. 5.78 grams of lithium hydroxide monohydrate are added to the autoclave and the autoclave evacuated to a maximum absolute pressure of 100 mm. mercury. The autoclave is then purged with nitrogen and 1490 grams of ethylene oxide are added to the autoclave over a period of 15 minutes. The pressure in the autoclave is 90 p.s.i.g. The temperature in the autoclave is maintained at 160° C. for .42 hour after the addition of ethylene oxide and then the temperature of the autoclave is decreased. When the temperature has decreased to about 120° C. the unreacted ethylene oxide is flashed off. The polyoxyethylene(2) 2,2bis(4-hydroxyphenyl) propane reaction product has an acid number of 1.42 and a hydroxyl number of 350.

EXAMPLE 5

35.10 grams of 2,2,bis(4-hydroxyphenyl) propane and 1490 grams of ethylene oxide are heated at 180° C. and at a pressure of 50 p.s.i.g. in the presence of 1.93 grams of lithium hydroxide monohydrate in accordance with the procedure of Example 4. The reaction product had the following analysis: hydroxyl number of 348 and an acid number of —0.55.

EXAMPLE 6

One mol of the polyoxypropylene(2) 2,2,bis(4-hydroxyphenyl) propane composition of Example 1, eight mols of propylene oxide, and eight millimols of sodium hydroxide are charged to a bomb autoclave and heated to 168±2° C. The resulting product is high purity polyoxypropylene(10) 2,2-bis(4-hydroxyphenyl) propane.

EXAMPLE 7

One mol of 2,2bis(4-hydroxy-3-methyl-phenyl) propane is reacted with two mols of ethylene oxide in the presence of 10 milligrams of lithium hydroxide monohydrate according to the procedure of Example 4. The resulting product is then reacted with twelve mols of ethylene oxide at 170±2° C. in the presence of 10 millimols of sodium hydroxide to yield high purity polyoxyethylene(14) 2,2,-bis(4-hydroxy-3-methyl-phenyl) propane.

EXAMPLE 8

2791 grams of the product of Example 2 and 0.37 gram of hydroquinone are charged to a carbon dioxide purged autoclave and heated to 110° C. 905 grams of fumaric acid are added to the autoclave and the mixture is heated to 190° C. When an acid number of 17 is reached, the autoclave is evacuated to 50 mm. mercury (absolute) and the reaction continued until a softening point of 101° C. is reached. The polyester resin formed is clear, has excellent shelf life, and a gel time of 40.5 minutes at room temperature.

EXAMPLE 9

2860 grams of the product of Example 3 and 3.79 grams of hydroquinone are charged to a carbon dioxide purged autoclave and heated to 110° C. 804 grams of fumaric acid are added and the mixture heated to 220° C. over a two hour period. The reaction is maintained at 220° C. and at atmospheric pressure for 1.50 hours. The pressure is then reduced to 20 mm. mercury (absolute) and held at this pressure for 4.17 hours. The reaction is then continued for an additional three hours so that the total reaction time is 10.67 hours. At this time, the polyester resin has a softening point of 102° C. and an acid number of 5.6. The polyester resin formed is clear, has excellent shelf-life, and a gel time of 25 minutes at room temperature.

EXAMPLE 10

2710 grams of the reaction product of Example 4 and 0.37 gram of hydroquinone are charged to a nitrogen purged autoclave and heated to 125° C. 1080 grams of fumaric acid are added to the autoclave and the temperature raised to 220° C. When the acid number has decreased to about 40, 26.8 grams of glycerine are added to the autoclave and the temperature maintained at 220° C. The reaction is continued under these conditions until the acid number has decreased to about 30 and then the pressure is dropped to 20 mm. mercury (absolute). The reaction is continued until a polyester resin is obtained having the following properties: softening point 122° C., acid number of 18.4, and saponification number of 287.

EXAMPLE 11

2800 grams of the product of Example 5 and 3.79 grams of hydroquinone are charged to a nitrogen purged autoclave and heated to 125° C. 990 grams of fumaric acid are added and the temperature increased to 190° C. The reaction mixture is held at this temperature for 2 hours and then 13.4 grams of glycerine are added to the autoclave. The reaction is continued under these conditions until the acid number has decreased to about 30 and then the pressure is dropped to 185 mm. mercury (absolute). The reaction is continued then for a total reaction time of 11 hours. The resulting polyester was analyzed and found to have the following properties: softening point 111° C., acid number of 10.9, and a saponification number of 266.

Although this invention has been described with reference to specific alkylene oxides, diphenols, and dicarboxylic acids as well as specific processes and method steps, it will be apparent that other equivalent materials may be substituted for those described and the method steps and types of processes may be altered, reversed and, in some cases eliminated all within the spirit and scope of this invention as defined in the appended claims.

Having described the invention, what is desired to be secured by Letters Patent is:

1. A process of preparing an oxyalkylated diphenol composition having substantially reduced amounts of decomposition products of diphenol which comprises reacting a diphenol having the formula

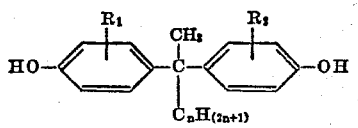

wherein $R_1$ and $R_2$ are independently selected from the group consisting of hydrogen and alkyl groups having from 1 to 4 carbon atoms and wherein $n$ is 1 or 2, with an alkylene oxide in the presence of a lithium catalyst selected from the group consisting of lithium hydroxide and lithium acetate to form an oxyalkylated diphenol and then reacting the oxyalkylated diphenol with alkylene oxide in the presence of a catalyst selected from the group consisting of sodium hydroxide, sodium acetate, potassium hydroxide, potassium acetate, cesium hydroxide, and cesium acetate.

2. A process of preparing an oxyalkylated diphenol composition having substantialy reduced amounts of decomposition products of diphenol which comprises reacting a diphenol having the formula

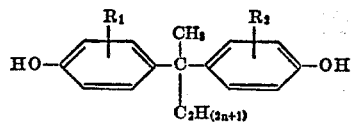

wherein $R_1$ and $R_2$ are independently selected from the group consisting of hydrogen and alkyl groups having from 1 to 4 carbon atoms and wherein $n$ is 1 or 2, with an alkylene oxide in the presence of lithium acetate and at a temperature from 100° C. to 200° C.

References Cited

UNITED STATES PATENTS 2,859,250  11/1958  Woodbridge et al. __ 260—613 B

OTHER REFERENCES

Schonfeldt: Surface Active Ethylene Oxide Adducts (1969), 32, 33, 124.

BERNARD HELFIN, Primary Examiner

U.S. Cl. X.R.

260—47 UA, 47 EQ